United States Patent
Fu et al.

(10) Patent No.: US 6,500,242 B2
(45) Date of Patent: Dec. 31, 2002

(54) APPARATUS AND METHOD FOR DEGASSING AND PREVENTING GELATION IN A VISCOUS LIQUID

(75) Inventors: Tzung-Chi Fu, Miaoli (TW); Albert An-Ho Yin, Taichung (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 35 days.

(21) Appl. No.: 09/756,613

(22) Filed: Jan. 4, 2001

(65) Prior Publication Data

US 2002/0083839 A1 Jul. 4, 2002

(51) Int. Cl.[7] .............................................. B01D 19/00
(52) U.S. Cl. .............................. 96/157; 96/194; 96/206
(58) Field of Search ......................... 95/241, 243, 247, 95/266, 248; 96/155, 156, 157, 193, 194, 204, 206; 210/188

(56) References Cited

U.S. PATENT DOCUMENTS

| | | | | |
|---|---|---|---|---|
| 3,713,274 A | * | 1/1973 | Sauer et al. | |
| 3,793,805 A | * | 2/1974 | Hoffman | |
| 3,885,930 A | * | 5/1975 | Scheerer | |
| 4,935,151 A | * | 6/1990 | Do | |
| 5,658,615 A | * | 8/1997 | Hasebe et al. | |
| 5,792,237 A | * | 8/1998 | Hung et al. | |
| 5,858,466 A | * | 1/1999 | Liu et al. | |
| 5,900,045 A | * | 5/1999 | Wang et al. | |
| 5,989,317 A | * | 11/1999 | Huang et al. | |
| 6,193,783 B1 | * | 2/2001 | Sakamoto et al. | |
| 6,238,576 B1 | * | 5/2001 | Yajima | |
| 6,336,959 B1 | * | 1/2002 | Kamo | |

* cited by examiner

*Primary Examiner*—Duane S. Smith
(74) *Attorney, Agent, or Firm*—Tung & Associates

(57) ABSTRACT

An apparatus for degassing and preventing gelation in a viscous liquid stored in a reservoir tank is provided. For a viscous liquid such as one that has a viscosity higher than 5000 cp, a reservoir tank that has a cavity for holding the liquid is first provided which is equipped with a liquid feed conduit and a liquid output conduit. The liquid feed conduit is configured in J-shape with an inlet end at a top of a first vertical section in fluid communication with a liquid source tank and an outlet end at an opposite end of a second vertical section of the J-shape conduit protruding above a liquid level stored in the tank cavity. A U-section of the liquid feed conduit is generally immersed in the viscous liquid.

20 Claims, 2 Drawing Sheets

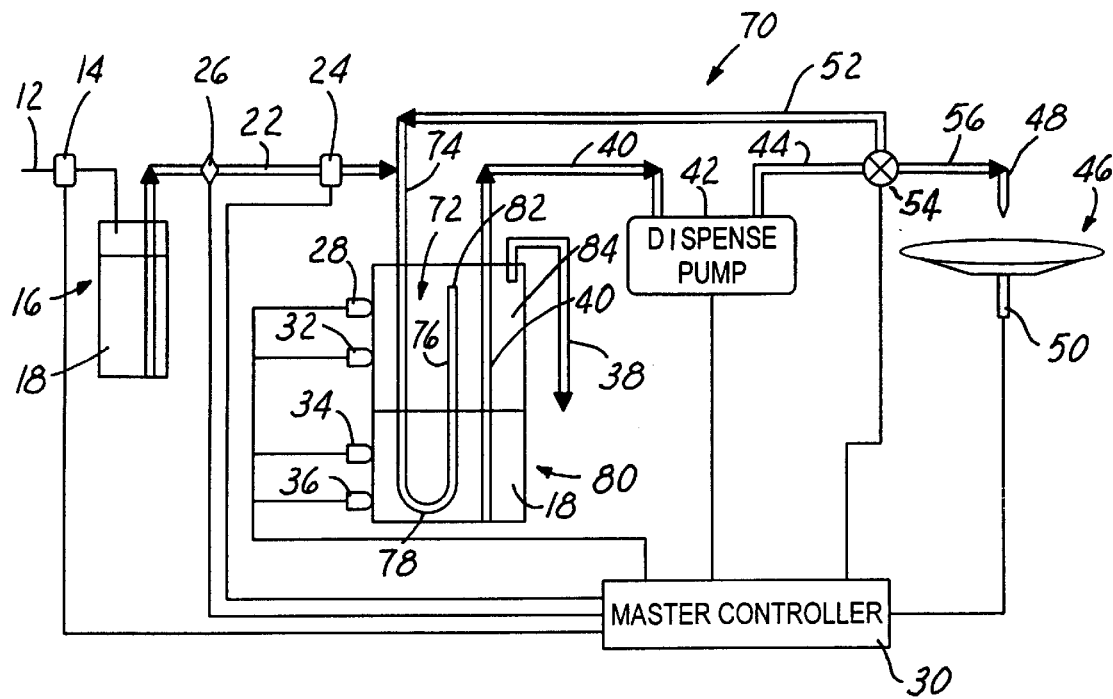

APPARATUS AND METHOD FOR DEGASSING AND PREVENTING GELATION IN A VISCOUS LIQUID

FIELD OF THE INVENTION

The present invention generally relates to an apparatus and a method for degassing and preventing gelation in a viscous liquid used in semiconductor processing and more particularly, relates to an apparatus and a method for eliminating air and gelation in a viscous liquid of polyimide used in semiconductor fabrication processes.

BACKGROUND OF THE INVENTION

In the fabrication of semiconductor devices, a semiconducting wafer must be processed in a multiplicity of fabrication steps, i.e. as many as several hundred in order to produce the final finished product. These processing steps may include etching, cleaning, deposition and various other processing procedures. A variety of chemicals, including liquids and gases may be used in the processing steps wither to etch a specific feature on the IC chip, to clean after certain processing steps, to deposit layers from reactant chemicals, or to carry out other necessary processing steps.

For instance, in photomasking and metal cleaning processes, a variety of speciality chemicals are used. An important consideration in the usage of such speciality chemicals, i.e. photoresists, developers, spin-on-glass and polyimide is the transporting and storage of the materials. In the case of a photoresist material, the photosensitivity and the shelf life of the material depends on its storage temperature. It is important to maintain such material within a range of 5° C. to 20° C. for a photoresist/developer and −20° C. to 10° C. for spin-on-glass/polyimide materials.

The transporting of these speciality chemicals, especially liquids, or the delivery from a storage reservoir, i.e. a holding tank or a buffer tank, to a processing chamber where the liquid is used is another important aspect of the fabrication process. A process liquid, such as a photoresist or a developer, can be transported in a fluid passageway of a stainless steel tubing assisted by an electrical pumping means. One of such conventional liquid delivery system for a polyimide passivation material is shown in FIG. 1.

FIG. 1 illustrates a conventional polyimide dispensing system 10 which utilizes compressed air in conduit 12 and valve 14 to exert a positive pressure in the source tank 16 such that a sufficient amount of a polyimide liquid 18 is applied to the reservoir tank 20 through conduit 22 and valve 24. The valve 14 is an open/closed valve for controlling the air pressure in conduit 12. Valve 14 is open when polyimide solution is requested from the reservoir tank 20 via master controller 30. Valve 14 is closed when no request is sent from reservoir tank 20. A sensor 26 is further provided for sensing the presence of a polyimide liquid in conduit 22. When the source tank 16 becomes empty, compressed air is drawn into the conduit 22 and activates the sensor 26 which then sends an alarm signal to the operator for refilling the source tank 16 with new polyimide solution. The sensor 26 can be an optical type which senses an intensity change of a refracted light as air enters the conduit 22. The function of valve 24 is the same as valve 14 which is open or closed at the same time to supply polyimide into the reservoir tank 20.

The reservoir tank 20 is a buffer tank for the polyimide solution 18. The major function for the reservoir tank 20 is to degas and to remove gel that flows in from the conduit 22 or the source tank 16. The sources of bubbles or gel may be of many different kinds, i.e. from the polyimide material itself during the fabrication of the material; from the conduit 22 during the replenishment of the source tank 16; or from the open/closed action of valve 24 during the operation of the polyimide dispensing system 10.

The reservoir tank 20 is equipped with four different sensors 28, 32, 34 and 36 for maintaining a suitable solution level in the tank. The level of the solution should be kept between the high sensor 32 and the low sensor 34. When the solution level is sufficiently low as to activate the low sensor 34, the low sensor 34 sends a signal to the master controller 30. The master controller 30 then controls valves 14 and 24 to refill the reservoir tank 20, and stop the refill action as the high sensor 32 is activated by the level of the solution. A second high sensor 28 is an overflow sensor which functions when the first high sensor 32 malfunctions to drain the excess solution from drain pipe 38. The low sensor 36 provides an interlock function when the solution level is sufficiently low to activate the low sensor 36 in order to prevent air from entering the outlet conduit 40 and the dispensing pump 42.

The dispensing pump 42 is normally provided in a dual-stage pump, i.e. such as a MILLIPORE® Photo-250 Pump, equipped with an internal filter (not shown). The dispensing pump 42 extracts the polyimide solution along conduit 40 from the reservoir tank 20 while filtering out contaminants such as bubbles and gel by the internal filter. The dispensing pump 42 then delivers the polyimide solution along conduit 44 for dispensing to wafer 46 through a dispensing nozzle 48. The wafer 46 is positioned on a wafer platform 50 by a vacuum means and spins by platform 50 during the polyimide spin coating process.

Under normal processing conditions, some bubbles will be found in the reservoir tank 20 and in the conduits 22 and 44. A complete polyimide flow takes place from the reservoir tank 20, through the conduit 40, the dispensing pump 42, the conduits 44 and 52 and the liquid feed conduit 60 by trapping a limited number of air bubbles by the internal filter provided in the dispensing pump 42. At the same time, a three-way valve 54 is utilized to divert a polyimide solution from conduit 44 to the conduit 52, while cutting out the solution flow in conduit 56. The recycled flow is used to save the usage of the polyimide material. The operation of the sensor 26, the valves 14, 24 and 48, the dispensing pump 42 and the wafer platform 50 is controlled by the master controller 30, which is normally a micro-processor.

The conventional viscous liquid dispensing system 10, shown in FIG. 1, while capable of stopping, by filtering out, some of the air bubbles trapped in the liquid, is not efficient in filtering out, or removing all the air bubbles. Furthermore, during the dispensing of a material such as polyimide for passivation of an IC device, a premature reaction or sometimes known as "a dark reaction" occurs in the polyimide liquid between the monomer and the initiator such that undesirable gel is formed. When the gel is dispensed onto the wafer surface, serious quality problems in the passivation layer occurs. An improved viscous liquid dispensing system is therefore desirable for dispensing a highly viscous liquid such as polyimide to not only degas the liquid by eliminating air bubbles, but also to prevent the formation of gel in the liquid.

While it has been found that oxygen, when contained in a polyimide solution prevents or retards the gelation process, there is little possibility that oxygen can be added to a polyimide solution in the conventional dispensing system. For example, the liquid feed conduit 60, shown in an enlarged, cross-sectional view in FIG. 1A, does not allow an extended, prolonged exposure of polyimide with air, which contains approximately 20% oxygen. As shown in FIG. 1A, the liquid feed conduit 60 is normally provided with a sharpened tip portion 62 to facilitate a polyimide flow 64 into the solution 18. While attempts have been made to increase the distance between the tip portion 62 and the liquid level 66, other undesirable processing difficulties are caused by an impact between the liquid flow 64 and the liquid level 66, resulting in a more severe air bubble problem. It should be noted that, for simplicity reason, the liquid output conduit 40 and the drain pipe 38 are not shown in FIG. 1A.

It is therefore an object of the present invention to provide an apparatus for degassing and preventing gelation in a viscous liquid stored in a reservoir tank that does not have the drawbacks or shortcomings of the conventional apparatus.

It is another object of the present invention to provide an apparatus for degassing and preventing gelation in a viscous liquid stored in a reservoir tank by eliminating a straight-tube type liquid feed conduit.

It is a further object of the present invention to provide an apparatus for degassing and preventing gelation in a viscous liquid stored in a reservoir tank by using a J-shaped liquid feed conduit.

It is another further object of the present invention to provide an apparatus for degassing and preventing gelation in a viscous liquid stored in a reservoir tank by utilizing a liquid feed conduit configured in a J-shape such that the exposure time of the liquid to ambient air is increased.

It is still another object of the present invention to provide an apparatus for degassing and preventing gelation in a viscous liquid stored in a reservoir tank by providing a liquid feed conduit having a J-shape and a wave-form exterior surface on the outlet of the conduit to further increase the exposure time of the liquid with ambient air.

It is yet another object of the present invention to provide an apparatus for degassing and preventing gelation in a viscous liquid stored in a reservoir tank by providing a specially configured liquid feed conduit such that the exposure time between the liquid and ambient air can be increased by at least two-fold.

It is still another further object of the present invention to provide a fluid reservoir tank for holding a viscous liquid therein and for eliminating air and gelation in the liquid by utilizing a liquid feed conduit that is formed in a J-shape having a bottom U-section immersed in the liquid.

SUMMARY OF THE INVENTION

In accordance with the present invention, an apparatus for degassing and preventing gelation in a viscous liquid stored in a reservoir tank is provided.

In a preferred embodiment, the apparatus for degassing and preventing gelation in a viscous liquid stored in a liquid reservoir tank is provided which includes a reservoir tank that has a cavity therein for holding a viscous liquid; a liquid feed conduit of J-shape that has an inlet end at a top of a first vertical section in fluid communication with a liquid source and an outlet end at an opposite end of a second vertical section of the J-shaped conduit protruding above the liquid, a U-section of the conduit is generally immersed in the liquid; and a liquid output conduit that has an inlet end immersed in the liquid and an outlet end in fluid communication with a dispensing nozzle of the liquid.

In the apparatus for degassing and preventing gelation in a viscous liquid stored in a reservoir tank, the outlet end of the liquid feed conduit further includes an exterior surface configured in a curvilinear form, the outlet end may further include an exterior surface configured in a wave-form, or in a sawtooth form. The outlet end of the liquid feed conduit may further include an exterior surface that is at least twice the interior surface of the conduit. The liquid feed conduit of J-shape may be constructed of a first vertical portion of a first length, a second vertical portion of a second length smaller than the first length, and a U-shape section connecting the first vertical portion and the second vertical portion together providing fluid communication therethrough. The outlet end of the liquid feed conduit of J-shape is at least 2 cm shorter than the inlet end. The first length of the first vertical section is at least 2 cm longer than the second length of the second vertical section. The liquid feed conduit may be formed of a corrosion-resistant material, or may be fabricated of a corrosion-resistant polymeric material. The reservoir tank may further include an overflow drain pipe for preventing overfilling of the tank. The apparatus may further include a pump means situated in-between the outlet end of the liquid outlet conduit and the dispensing nozzle.

The present invention is further directed to a fluid reservoir tank for holding a viscous liquid therein and for eliminating air and gelation in the liquid which includes a tank body that has a cavity therein for holding a quantity of the liquid; a liquid feed conduit formed generally in a J-shape that has a first vertical section and a second vertical section connected in fluid communication by a bottom U-shaped section, the first vertical section has an inlet end connected to a liquid source, the second vertical section has a length smaller than the first vertical section and an output end for overflowing the liquid into the cavity while exposed above a surface of the liquid in the cavity with the bottom U-shape section immersed in the liquid; and a liquid output conduit of a straight shape that has an inlet end immersed in the liquid juxtaposed to a bottom of the cavity and an outlet end in fluid communication with a dispensing nozzle for the liquid.

In the fluid reservoir tank for holding a viscous liquid and for eliminating air and gelation in the liquid, the outlet end of the liquid feed conduit may further include an exterior surface that is configured in a curvilinear form, or in a wave-form or in a sawtooth form. The exterior surface may be at least twice the interior surface of the conduit. The second length of the second vertical section may be at least 2 cm shorter than the first length of the first vertical section. The liquid feed conduit and the liquid output conduit may be formed of a TEFLON (tetra-fluoro-ethylene) material. The system may further include a pump means connected in fluid communication between the outlet end of the liquid outlet conduit and the dispensing nozzle.

BRIEF DESCRIPTION OF THE DRAWINGS

These and other objects, features and advantages of the present invention will become apparent from the following detailed description and the appended drawings in which:

FIG. 2 is an illustration of the present invention liquid dispensing system for a highly viscous polyimide passivation material equipped with a J-shape liquid feed conduit.

FIG. 2A is an enlarged, cross-sectional view of the present invention liquid feed conduit shown in FIG. 2.

FIG. 2B is an enlarged, cross-sectional view of a second embodiment of the present invention liquid feed conduit shown in FIG. 2.

DETAILED DESCRIPTION OF THE PREFERRED EMBODIMENT

Figure 1:
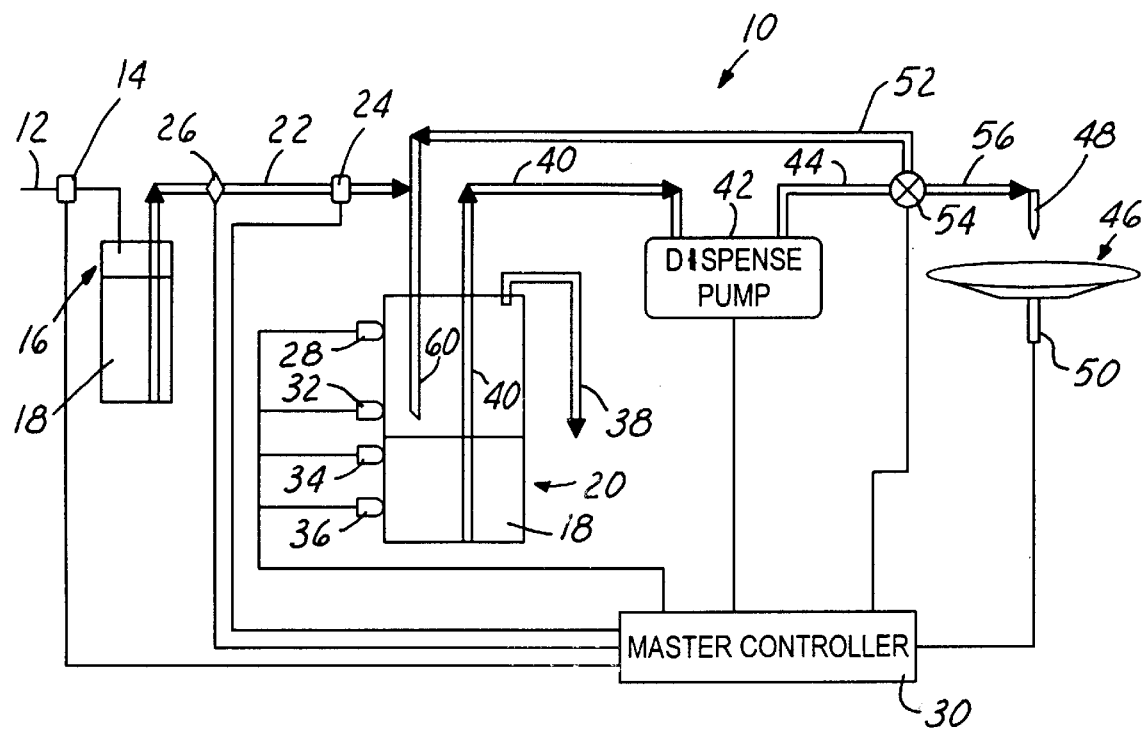
FIG. 1 is an illustration of a conventional liquid dispensing system used for dispensing a polyimide passivation material.
Figure 1A:
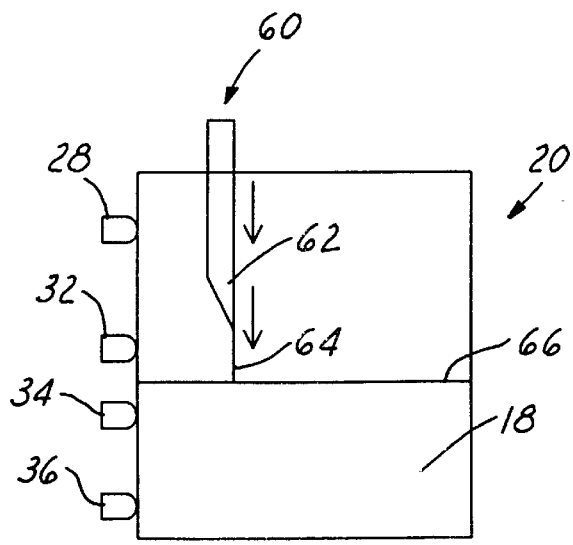
FIG. 1A is an enlarged, partial, sectional view of the reservoir tank and the liquid feed conduit into the tank shown in FIG. 1.

The present invention discloses an apparatus for degassing and preventing gelation in a viscous liquid storage in a liquid reservoir tank. While the present invention apparatus can be used for storing any type of liquid that has a high-viscosity, for instance, higher than 5000 cp, it is particularly useful for degassing and preventing gelation in a viscous polyimide liquid that is normally used in semiconductor processing as a passivation layer formed by a spin-coating process.

In the apparatus for eliminating air and gelation in the viscous polyimide solution, a reservoir tank that has a cavity therein for storing the liquid is first provided. The reservoir tank is equipped with a liquid feed conduit that is formed of J-shape with an inlet end at a top of a first vertical section in fluid communication with a liquid source, or with a polyimide source tank. The liquid feed conduit further has an outlet end at an opposite end of a second vertical section of the J-shape conduit that protrudes above the liquid stored in the cavity. A U-section of the liquid feed conduit is normally immersed in the polyimide solution. The apparatus is further provided with a liquid outlet conduit, normally of a straight tube, that has an inlet end immersed in the liquid close to a bottom of the cavity and an outlet end in fluid communication with a dispensing nozzle for the polyimide solution. A pump means may further be provided for withdrawing the polyimide from the reservoir tank to the dispensing nozzle.

In another embodiment of the present invention, the J-shaped liquid feed conduit may further be provided with an outlet end that has an exterior surface configured in a curvilinear form, or configured in a wave-form or in a sawtooth form such that the total area for the exterior surface of the outlet end is significantly larger than a surface for a straight tube. In a suitably designed curvilinear form for the exterior surface, the total surface area easily doubles the total surface for an interior surface of the outlet tube.

The outlet end of the liquid feed conduit of J-shape may be at least 2 cm shorter than the inlet end. It has been found that the larger the difference in the lengths of the outlet end and the inlet end, the longer exposure time is between the polyimide liquid and the ambient air and thus, more oxygen may be absorbed into the polyimide solution for preventing gel formation. The liquid feed conduit and the liquid output conduit should both be fabricated of a corrosion-resistant material, or a corrosion-resistant polymeric material such as TEFLON such that any type of liquid may be processed in the present invention apparatus.

The liquid feed conduit of the present invention may further be constructed of J-shape that has a first vertical portion of a first length, a second vertical portion of a second length that is smaller than the first length, and a U-shape section connecting the first vertical portion and the second vertical portion together providing fluid communication therethrough and is immersed in the viscous liquid contained in the cavity of the reservoir tank.

Referring now to FIG. 2, wherein a present invention viscous liquid dispensing system 70 is shown. In the liquid dispensing system 70, the compressed air feed conduit 12, the first on/off valve 14, the source tank 16 for polyimide material 18, the liquid sensor 26, the liquid feed conduit 22 and the second on/off flow control valve 24 are provided. The present invention reservoir tank 80 is further provided with a liquid feed conduit 72 of J-shape which has a first vertical section 74 and a second vertical section 76, connected by a U-shape section 78 for fluid communication therein between. The first vertical section 74 has a longer length than the second vertical section 76 such that the polyimide solution overflows an opening 82 of the second vertical section 76 to enter the cavity 84 of the reservoir tank 80. Fluid level sensors 28,32,34 and 36 are further provided, which are similar to that used in the conventional system, on the reservoir tank 80. A liquid outlet tube 40 and an overflow drain pipe 38 are further provided in the reservoir tank 80. A master controller 30 is used to control the valves 14,24, the various fluid level sensors 28~36, the sensor 26, and the dispensing pump 42 connected to conduit 40. The remaining system, including conduit 44, the recirculating conduit 52, the three-way valve 54, the conduit 56, the dispensing nozzle 48 are similar to that shown in FIG. 1.

An enlarged, cross-sectional view of the liquid feed conduit 72 is further shown in FIGS. 2A and 2B in two different embodiments. In the embodiment shown in FIG. 2A, a planar surface is provided on the exterior of the second vertical section 76 of the liquid feed conduit 72 such that liquid 18 overflows from the outlet end 82 into the cavity 84 of the reservoir tank 80. It is desirable that the length of the second vertical section 76 be as long as possible without colliding with the reservoir tank 80 such that a longer exposure time of the liquid overflow 18 with ambient air inside the cavity 84 is obtained. This extended exposure time enables the polyimide solution to absorb as much oxygen as possible and thus to prevent, or retard any premature reaction between a polymer precursor and a photoinitiator for the polyimide material. This effectively prevents gel formation in the liquid 18. The extended exposure time of the overflown liquid 18 on the second vertical portion 76 further allows any entrapped air bubbles in the liquid 18 to escape to the ambient air and thus minimizing air content in the liquid 18.

To further improve the exposure time between the liquid 18 and the ambient air in cavity 84, a second embodiment is shown in FIG. 2B wherein the exterior surface of the second vertical portion is provided in a curvilinear form 90, or in a wave-form as shown. In the second embodiment shown in FIG. 2B, the time required for the overflown liquid 18 along the exterior surface area of the second vertical section 76 is increased when compared to the configuration shown in FIG. 2A. The extended length of time allowed for exposing the liquid 18 to the ambient air in cavity 84 further improves oxygen absorption into the liquid 18 and the air bubble elimination from the liquid. It should be noted that the wave-form 90 shown in FIG. 2B is only one of many possible configurations that can be provided on the exterior surface of the second vertical section 76. For instance, any other curvilinear forms or sawtooth form may be used to achieve the same desirable result. By high viscosity, it is meant that any viscosity of a liquid that is higher than 5000 cp. Certain grades of the polyimide solution utilized in forming passivation layers in semiconductor processing have viscosities between about 7000 cp and about 8400 cp.

The present invention novel apparatus for degassing and preventing gelation in a viscous liquid, such as a polyimide solution, stored in a liquid reservoir tank has therefore been amply described in the above description and in the appended drawings of FIGS. 2, 2A and 2B.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows.

What is claimed is:

1. An apparatus for degassing and preventing gelation in a viscous liquid stored in a reservoir tank comprising:
    a reservoir tank having a cavity therein for holding a liquid;
    a liquid feed conduit of J-shape having an inlet end in fluid communication with a liquid source and an outlet end at an opposite end of a second vertical section of said J-shape conduit protruding above said liquid, a U-section of said conduit being generally immersed in said liquid; and
    a liquid output conduit having an inlet end immersed in said liquid and an outlet end in fluid communication with a dispensing nozzle of said liquid.

2. An apparatus for degassing and preventing gelation in a viscous liquid stored in a reservoir tank according to claim 1, wherein said outlet end of said liquid feed conduit further comprises an exterior surface configured in a curvilinear form.

3. An apparatus for degassing and preventing gelation in a viscous liquid stored in a reservoir tank according to claim 1, wherein said outlet end of said liquid feed conduit further comprises an exterior surface configured in a wave-form.

4. An apparatus for degassing and preventing gelation in a viscous liquid stored in a reservoir tank according to claim 1, wherein said outlet end of said liquid feed conduit further comprises an exterior surface configured in a sawtooth form.

5. An apparatus for degassing and preventing gelation in a viscous liquid stored in a reservoir tank according to claim 1, wherein said outlet end of said liquid feed conduit further comprises an exterior surface at least twice the interior surface of said conduit.

6. An apparatus for degassing and preventing gelation in a viscous liquid stored in a reservoir tank according to claim 1, wherein said liquid feed conduit of J-shape being constructed of a first vertical portion of a first length, a second vertical portion of a second length smaller than said first length, and a U-shape section connecting said first vertical portion and said second vertical portion together providing fluid communication therethrough.

7. An apparatus for degassing and preventing gelation in a viscous liquid stored in a reservoir tank according to claim 1, wherein said outlet end of said liquid feed conduit of J-shape being at least 2 cm shorter than said inlet end.

8. An apparatus for degassing and preventing gelation in a viscous liquid stored in a reservoir tank according to claim 6, wherein said second length of said second vertical section being at least 2 cm shorter than said first length of said first vertical section.

9. An apparatus for degassing and preventing gelation in a viscous liquid stored in a reservoir tank according to claim 1, wherein said liquid feed conduit being formed of a corrosion-resistant material.

10. An apparatus for degassing and preventing gelation in a viscous liquid stored in a reservoir tank according to claim 1, wherein said liquid feed conduit further being fabricated of a corrosion-resistant polymeric material.

11. An apparatus for degassing and preventing gelation in a viscous liquid stored in a reservoir tank according to claim 1, wherein said reservoir tank further comprises an overflow drain pipe for preventing overfilling of said tank.

12. An apparatus for degassing and preventing gelation in a viscous liquid stored in a reservoir tank according to claim 1, further comprising a pump means situated in-between said outlet end of said liquid outlet conduit and said dispensing nozzle.

13. A fluid reservoir tank for holding a viscous liquid therein and for eliminating air and gelation in said liquid comprising:
    a tank body having a cavity therein for holding a quantity of said liquid;
    a liquid feed conduit formed generally in a J-shape having a first vertical section and a second vertical section connected in fluid communication by a bottom U-shape section, said first vertical section having an inlet end connected to a liquid source, said second vertical section having a length smaller than said first vertical section and an outlet end for overflowing said liquid into said cavity while exposed above a surface of said liquid in said cavity with said bottom U-shape section immersed in said liquid; and
    a liquid output conduit of a straight shape having an inlet end immersed in said liquid juxtaposed to a bottom of said cavity and an outlet end in fluid communication with a dispensing means for said liquid.

14. A fluid reservoir tank for holding a viscous liquid according to claim 13, wherein said outlet end of said liquid feed conduit further comprises an exterior surface configured in a curvilinear form.

15. A fluid reservoir tank for holding a viscous liquid according to claim 13, wherein said outlet end of said liquid feed conduit further comprises an exterior surface configured in a wave-form.

16. A fluid reservoir tank for holding a viscous liquid according to claim 13, wherein said outlet end of said liquid feed conduit further comprises an exterior surface configured in a sawtooth form.

17. A fluid reservoir tank for holding a viscous liquid according to claim 13, wherein said outlet end of said liquid feed conduit further comprises an exterior surface at least twice the interior surface of said conduit.

18. A fluid reservoir tank for holding a viscous liquid according to claim 13, wherein said second length of said second vertical section being at least 2 cm shorter than said first length of said first vertical section.

19. A fluid reservoir tank for holding a viscous liquid according to claim 13, wherein said liquid feed conduit and said liquid output conduit being formed of a tetra-fluoro-ethylene material.

20. A fluid reservoir tank for holding a viscous liquid according to claim 13 further comprising a pump means connected in fluid communication between said outlet end of said liquid outlet conduit and said dispensing nozzle.

* * * * *